Sept. 28, 1926.  
F. J. WALLER  
1,601,606  
COMBINATION TEST PANEL AND POLYPHASE METER TRIM  
Filed April 5, 1923     3 Sheets-Sheet 1

Sept. 28, 1926.  
F. J. WALLER  
1,601,606  
COMBINATION TEST PANEL AND POLYPHASE METER TRIM  
Filed April 5, 1923  3 Sheets-Sheet 2
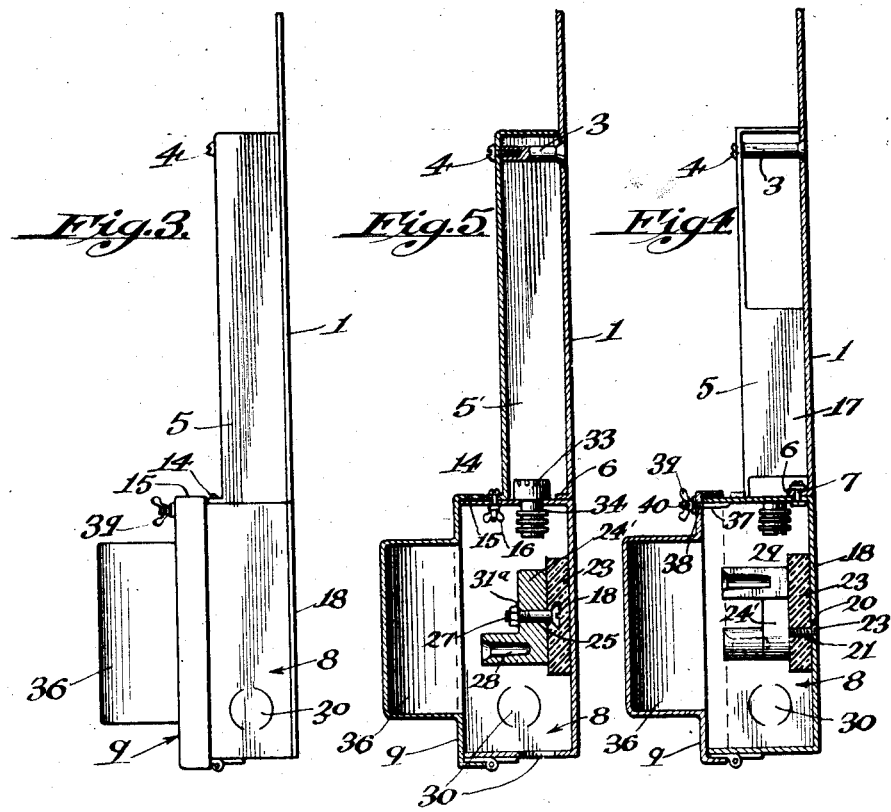
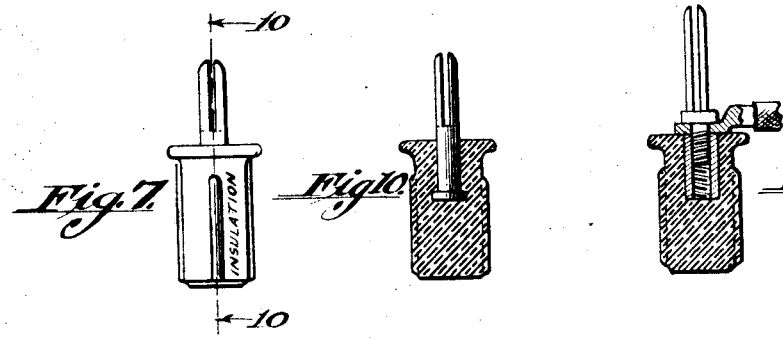

Sept. 28, 1926.

F. J. WALLER 1,601,606

COMBINATION TEST PANEL AND POLYPHASE METER TRIM

Filed April 5, 1923     3 Sheets-Sheet 3

Patented Sept. 28, 1926.

1,601,606

UNITED STATES PATENT OFFICE.

FRANK J. WALLER, OF SANTA ANA, CALIFORNIA.

COMBINATION TEST PANEL AND POLYPHASE METER TRIM.

Application filed April 5, 1923. Serial No. 630,103.

My present invention is a combined test panel and meter trim, and it is a special object of this invention to provide a unitary and attractive structure which shall not only prevent the unsightly and dangerous exposure of conductive elements connected with a meter but which shall also include means to facilitate the testing of meters, and especially polyphase meters, without interruption of service.

In many communities, legislation has forbidden the use of exposed wiring, but even where the ordinary conductors and connections are required to be and are in fact completely insulated and concealed, it is not unusual to find dangerously exposed wires and connections in the immediate vicinity of a meter, or in the vicinity of the switch or other circuit breaking means which is commonly installed adjacent thereto. It is accordingly an object of the present invention to provide a simple and comparatively inexpensive trim by which the ends of the wires leading to and from a meter and to and from a suitable set of circuit closing elements may be covered and concealed; and, in my preferred form, I provide a back plate which is adapted to receive alternatively any one of a variety of meters, and in connection with this back plate I employ trim plates, which may be arranged on opposite sides of the meter, and may be adapted to separate removal and replacement,—all of the major parts above referred to being optionally made of sheet metal.

It is a further object of my invention to provide, adjacent to a meter and preferably connected with a back plate to which said meter may be secured, a box or cabinet or compartment adapted to contain not only means by which the circuit or circuits with which the meter is connected may be closed or opened but also, in my preferred embodiment, means, also within the mentioned cabinet, which may enable the parts referred to to be used as a test panel, the construction last referred to being especially advantageous in the testing of polyphase meters.

It is a further object of this invention to provide novel features of detail contributive to the purposes above described and to my broad object of combining a safe and attractive meter trim with a test panel and circuit closing means suitably protected and confined within a receptacle which may be provided with a hinged cover adapted to be locked or sealed.

Other objects of my invention will appear from the following description of a preferred embodiment thereof and the appended claims, taken in connection with the accompanying drawings, in which Fig. 1 is an elevation, showing the parts of my invention as assembled and secured to a wall, no meter and no wiring being shown.

Fig. 2 is a top plan view of the parts shown in Fig. 1.

Fig. 3 is a side elevation, as seen from the direction indicated by the arrow 3 on Fig. 1.

Fig. 4 is a vertical section on the line 4—4 of Fig. 1.

Fig. 5 is a vertical section on the line 5—5 of Fig. 1.

Figs. 7, 8 and 9 are respectively elevations and top and bottom views of a preferred type of conductive plug to be used in my apparatus.

Fig. 10 is a sectional view corresponding to Fig. 7.

Fig. 11 is a corresponding view of a plug modified to serve for the connection of an independent comparison instrument.

Figure 6:
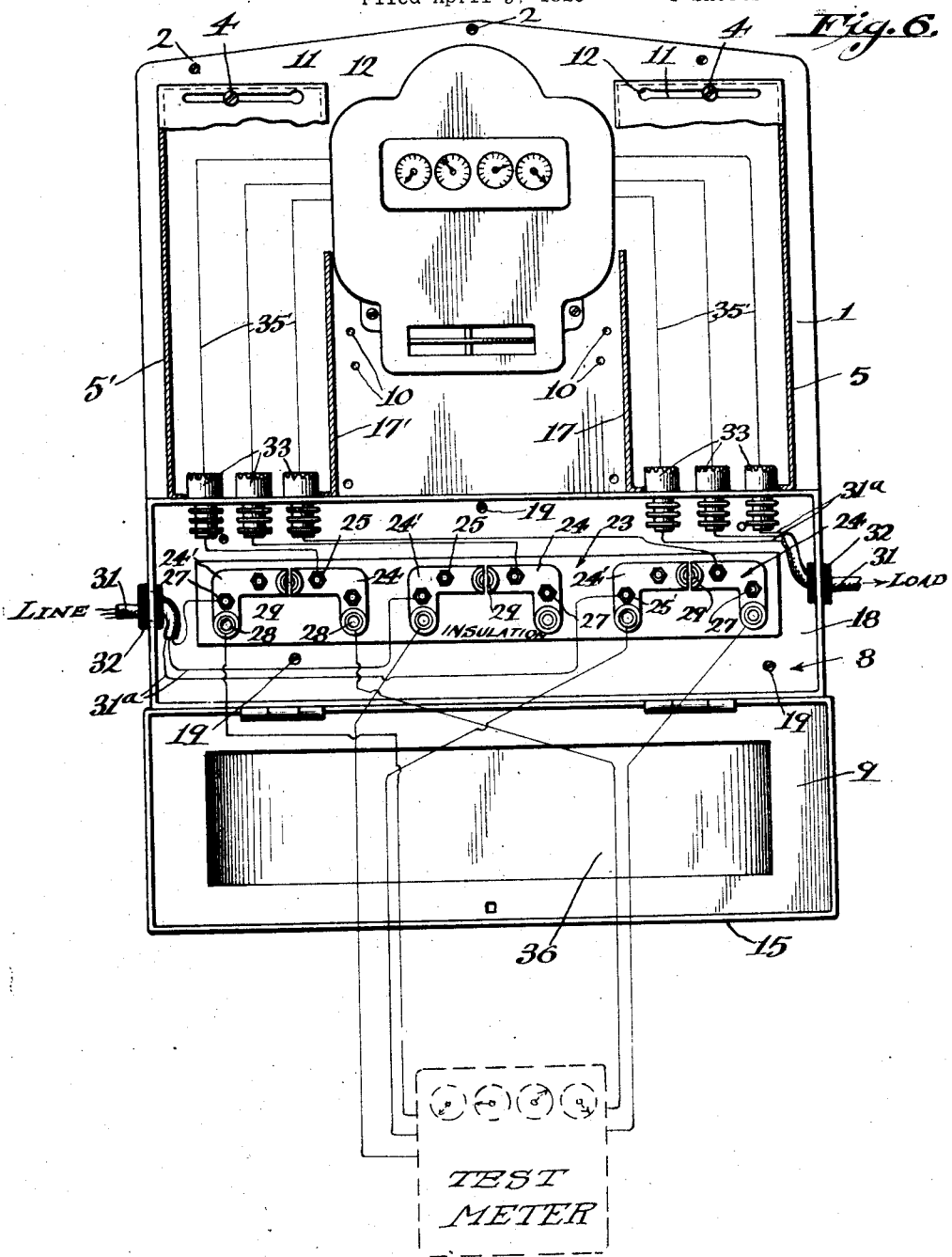
Fig. 6 is an elevation corresponding to Fig. 1, but showing the test cabinet open and showing a meter installed. One of the possible wiring connections is shown, and the mode of using a test meter or other comparison instrument in connection with the test panel is suggested by means of dotted lines.

Referring in detail to the parts of that specific form of my invention which I have selected for illustration, 1 is a back plate, which may be secured and grounded by means such as the screws 2, and may be provided with posts 3, which may be welded thereto and tapped and threaded to permit the employment of screws 4 as a means for securing the trim plates 5, 5'; and the back plate 1 may also be provided at the bottom with a horizontal extension 6 provided with apertures adapted to receive securing means such as the bolts 7, by which the body of the cabinet 8, having a hinged front or cover 9, may be secured thereto.

From the foregoing it will be apparent that my invention consists essentially of a cabinet, within which a panel may be supported, and a back plate adapted to support a meter and provided with trim plates covering the connections from said cabinet to said meter; and in order to adapt my device to use in connection with meters of various types, I may provide the back plate 1 with suitably spaced perforations 10, shown as arranged in pairs thereon, and suitably spaced to receive different makes of meters referred to; and in order to facilitate the removal of either of the trim plates 5, 5' when wiring connections are being made or altered, I may provide, near the top of each of these plates, a key-hole slot 11, whose widest portion 12 may be of sufficient diameter to permit the head of the screw 4, upon the mentioned post 3, to pass therethrough. A similar construction may be employed at the bottoms of the respective plates 5, 5', where I have shown key-hole slots 13 adapted to cooperate with the bolts 14, extending through the top plate 15 of the cabinet and optionally secured by means of the wing nuts 16 on the lower side thereof.

It will be understood that the trim plates 5, 5' are alike except as they are adapted to go on opposite sides of the meter, and to facilitate the bringing of wiring connections from the cabinet to the meter, the upper portions of the sides 17, 17' of the plates referred to are cut away, and no bottoms are provided.

Within the cabinet 8, any suitable means for opening and closing circuits may be provided; but, for this purpose, I prefer to provide the specific organization which I will now describe, my preferred organization being such as to permit not only the making and breaking of circuits, but the testing of the meter associated therewith. In the back plate 18 of the cabinet 8 I may provide not only small apertures adapted to receive the securing screws 19 but also additional apertures 20 surrounded by inwardly extending bosses 21, adapted to receive the heads of screws 22, by which a plate 23 of insulating material, such as bakelite, may be secured. In order to support pairs of conductive plates or receptacles 24, 24' from the insulating element 23, I may embed in the latter the heads of screws 25, adapted to extend forward through apertures 26 in the conductive plates or receptacles and to cooperate with nuts 27.

In my preferred construction, I provide tapered apertures or sockets 28 in the mentioned receptacles; and when I form the latter by casting, I prefer to cast a pair of them comprising two terminal apertures and one central aperture, as a unit, and thereafter separate the two halves, 24, 24', by sawing or otherwise cutting upon a line, extending through the median aperture or socket 29. By this construction it will be obvious that, for example, when one of the plates constituting a pair is connected with a line wire and the other plate is connected with the meter, the maintenance of a circuit through the meter will depend upon the insertion of a suitable plug in the median aperture 29, to bridge the gap which has resulted from the sawing of the plates therethrough. It will also be apparent that whenever the meter comprised in an installation of the character referred to is to undergo a test, suitable plugs connected with the test instrument may be inserted in the terminal apertures 28. Upon the subsequent removal of the conductive plug from the aperture 29, it will be obvious that, without an interruption of the current through the apparatus with which the leads from the meter may be connected, the test instrument and the regularly installed meter may be placed in series for purposes of comparison.

At the bottom of the test cabinet and at the ends thereof I prefer to provide knockout plates 30; and when cables 31, having strands 31ª, are to be inserted through any of these openings, a suitable insulating bushing 32 should be provided. Insulating bushings 33 are also shown in the openings 34, through which the conductive wires 35, 35' pass from the test cabinet to and from the meter M; but conduit connections may be preferred.

Except when the conductive plugs which connect the complemental sections 24, 24', are to be withdrawn, or when a meter is to be tested (as suggested in dotted lines in Fig. 6) or when other changes are to be made, the door 9, shown as provided with an extension front 36 to allow ample room for plugs and connections, may be secured by means such as the bolt 37, secured at its inner end, as by welding, and extending through a suitable aperture 38 in the door 9, this bolt being shown as provided with a wing nut 39. Both the bolt and the wing nut may be provided with an aperture 40, to permit the sealing of the cabinet.

While I have described in detail one preferred embodiment of the present invention, it will be understood that various modifications might be made in each of the elements described, and that various features of my invention might be independently employed. Any one of a great variety of wiring connections might be utilized; and as indicated above, the back plate to which the associated parts of my invention are secured is preferably provided in advance with alternative apertures, suitably spaced to provide for the attachment of any one of several polyphase meters already on the market.

What is claimed is:

1. A meter mounting and test panel comprising in combination a substantially rectangular back plate having a rectangular cabinet formed on the lower end thereof, the said cabinet having top, side and bottom walls, the back plate forming a back wall, the top wall having a series of apertures for wires, a pair of separate trim plates each having front, side and top walls with an open base adapted to fit on top of the top wall of the cabinet and over the said apertures, the facing side walls having openings adapted for lead wires, the said trim plates being spaced apart leaving a space on the back plate for an electric meter.

2. A meter mounting and test panel comprising in combination a substantially rectangular back plate, a rectangular cabinet at the lower end thereof having top, bottom and side walls extending outwardly from the back plate, the back plate forming the back wall of the cabinet, a series of apertures through the top wall of the cabinet adjacent each end, apertures through the side walls of the cabinet for line wires, a cover attached to the cabinet, a pair of separate trim plates each having opposite side front and top walls and having an open base, a slot formed in the front wall of each trim plate, screws secured to the back plate adapted to fit the said slots and to adjust the said trim plates towards and from each other, openings in the adjacent sides of the trim plates for wires, the base of the plates resting on the top of the cabinet over the apertures and the said trim plates being adjustable laterally to form a spacing for a meter therebetween.

In testimony whereof I have signed my name to this specification.

FRANK J. WALLER.